(12) United States Patent
Morimoto et al.

(10) Patent No.: US 11,321,971 B2
(45) Date of Patent: May 3, 2022

(54) VEHICLE AND VIDEO IMAGE OUTPUT DEVICE

(71) Applicant: PANASONIC INTELLECTUAL PROPERTY MANAGEMENT CO., LTD., Osaka (JP)

(72) Inventors: Akihiro Morimoto, Kanagawa (JP); Takanobu Ito, Kanagawa (JP); Manabu Nakakita, Kanagawa (JP); Yuya Hamai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 239 days.

(21) Appl. No.: 16/828,235

(22) Filed: Mar. 24, 2020

(65) Prior Publication Data
US 2020/0312054 A1 Oct. 1, 2020

(30) Foreign Application Priority Data
Mar. 25, 2019 (JP) .............................. JP2019-057342

(51) Int. Cl.
*G07C 5/06* (2006.01)
*B62D 6/00* (2006.01)
*B60K 35/00* (2006.01)
*B60K 23/00* (2006.01)

(52) U.S. Cl.
CPC ................ *G07C 5/06* (2013.01); *B60K 35/00* (2013.01); *B62D 6/00* (2013.01); *B60K 23/00* (2013.01); *B60K 2370/167* (2019.05)

(58) Field of Classification Search
CPC .... G07C 5/06; B60K 35/00; B60K 2370/167; B60K 23/00; B62D 6/00
See application file for complete search history.

(56) References Cited

FOREIGN PATENT DOCUMENTS

| JP | 2012-141218 | 7/2012 |
|----|-------------|--------|
| JP | 2018-034659 | 3/2018 |

*Primary Examiner* — Mathew Franklin Gordon
(74) *Attorney, Agent, or Firm* — Greenblum & Bernstein, P.L.C.

(57) ABSTRACT

When a gearshift of a vehicle is in drive, a video image of a movement state of the vehicle moving forward depending on the rotation of the wheels detected by a wheel rotation sensor is displayed on a monitor. Thereafter, when the gearshift is in neutral, a video image of a movement state of the vehicle moving forward depending on the rotation of the wheels is displayed on the monitor. When the gearshift is in rear where the vehicle moves in a second direction opposite to a first direction, a video image of a movement state of the vehicle moving in the second direction depending on the rotation of the wheels is displayed on the monitor. Thereafter, when the gearshift is in neutral, a video image of a movement state of the vehicle moving in the second direction depending on the rotation of the wheels is displayed on the monitor.

20 Claims, 8 Drawing Sheets

VEHICLE AND VIDEO IMAGE OUTPUT DEVICE

TECHNICAL FIELD

The present disclosure relates to a vehicle provided with a parking assistance device that guides the own vehicle to a target position by automatic steering, and relates to a video image output device used as the parking assistance device.

BACKGROUND ART

Conventionally, the above-mentioned parking assistance device has been developed. For example, a parking assistance device described in Patent Literature 1 is provided with: a path calculation circuit that calculates the movement path from the current vehicle position to a first target position of parking; a movement control circuit that guides the vehicle to the first target position by executing steering control based on the movement path; a display control circuit that displays a switching position on a display circuit in a case where the movement path includes a K-turn position; and a passage detection circuit that detects that the vehicle passed the K-turn position without a K-turn, and in a case where the passage detection circuit detects that the vehicle passed the K-turn position without a K-turn, the path calculation circuit calculates a new movement path up to a second target position that can be reached without a K-turn in the neighborhood of the first target position, whereby the movement control circuit guides the vehicle to the second target position by executing steering control based on the new movement path.

On the other hand, as a device that determines the movement direction of a vehicle, for example, a movement direction determination device described in Patent Literature 2 is present. The movement direction determination device described in Patent Literature 2 calculates a theoretical value of acceleration with the product of the speed of the vehicle detected by the vehicle speed sensor and the angular speed detected by a yaw gyro, and compares the direction of the calculated theoretical value of acceleration and the direction of the actual measurement value of acceleration detected by the acceleration sensor. When these directions are the same, the movement direction determination device determines that the movement direction is forward, and when the directions are not the same, it determines that the movement direction is rearward.

CITATION LIST

Patent Literature

Patent Literature 1: JP-A-2018-034659
Patent Literature 2: JP-A-2012-141218

SUMMARY OF INVENTION

In the estimation of the position of the own vehicle in parking assistance, in a case where the gearshift is in neutral, since it is unknown whether the vehicle is moving forward or rearward, the position of the own vehicle cannot be accurately estimated, so that the parking position is shifted. In a case where the gearshift is set in parking, although the driving wheels are locked, the vehicle moves several centimeters, so that an error occurs in automatic position estimation although not as much as in the case of neutral (N).

This problem will be described in detail.

FIG. 8 is a view showing an estimated own vehicle position and an actual own vehicle position in a case where after moving forward with the gearshift being in drive (D), a vehicle 100 moves forward with the gearshift being in neutral (N). As shown in the figure, in a case where the gearshift is switched into neutral (N) after the vehicle 100 moves forward with the gearshift being set in drive (D) at a parking start point P0, a rearward movement path is generated at an own vehicle position P2 estimated in the parking assistance device, and the vehicle 100 moves rearward along this rearward movement path with the gearshift being set in rear (R) at a K-turn start position P1; however, there are cases where the vehicle 100 enters a position off an end point Pf of a driving area PA. That is, because of the forward movement with the gearshift being in neutral (N), an actual own vehicle position P3 becomes off the estimated own vehicle position P2, and when the vehicle 100 moves rearward from the actual own vehicle position P3 along the rearward movement path with the gearshift being in rear (R), there are cases where the vehicle enters an end point Pf off the end point Pf of the parking area PA. The own vehicle position is, for example, the center Ca of the rear wheel axle.

FIG. 9 is a view showing an estimated own vehicle position and an actual own vehicle position in a case where after moving rearward with the gearshift being in rear (R), the vehicle 100 moves rearward with the gearshift being in neutral (N). As shown in the figure, after moving forward with the gearshift being set in drive (D) at the parking start position P0, the vehicle 100 moves rearward with the gearshift being set in rear (R) at the K-turn start point P1. In a case where the gearshift is switched into neutral (N) after the vehicle 100 moves rearward with the gearshift being in rear (R), a case occurs where the actual own vehicle position P3 reaches the end point Pf although the own vehicle position P2 estimated by the parking assistance device has not reached the end point Pf. When the end point Pf becomes unknown, the vehicle 100 continues moving rearward at the user's discretion, or the user stops the operation of the parking assistance device (alternatively, tries to generate a next path).

As described above, in a case where the vehicle 100 moves with the gearshift being in neutral (N), since it is unknown whether the vehicle 100 moves forward or rearward, the own vehicle position cannot be accurately estimated, and for this reason, the estimated own vehicle position is off the actual own vehicle position, which makes parking in the correct position impossible.

An object of the present disclosure is to provide a vehicle and a video image output device with which the own vehicle position can be accurately estimated and the vehicle can be parked in a correct position even in a case where the vehicle moves with the gearshift being in neutral (N).

DESCRIPTION OF EMBODIMENTS

Figure 1:
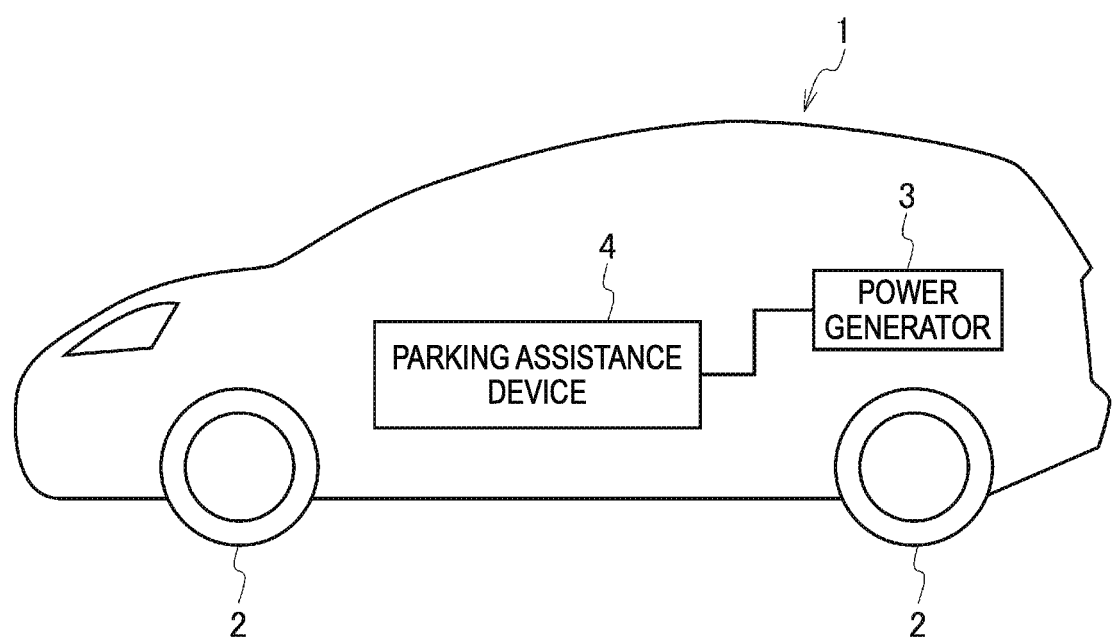
FIG. 1 is a view showing the appearance of a vehicle in an embodiment and a power generator and a parking assistance device mounted on the vehicle.

Hereinafter, referring to the drawings as appropriate, an embodiment (hereinafter, referred to as "present embodiment") concretely disclosing a vehicle and a video image output device according to the present disclosure will be described in detail. Here, there are cases where a description that is detailed more than necessary is omitted. For example, there are cases where a detailed description of an already well-known matter and an overlapping description of an element that is substantially the same are omitted. This is in order to avoid the following description becoming unnecessarily redundant to facilitate the understanding of one of ordinary skill in the art. The attached drawings and the following description are provided in order for one of ordinary skill in the art to sufficiently understand the present disclosure and do not intend to limit the subject matter described in the claims.

Hereinafter, a preferred embodiment for carrying out the present disclosure will be described in detail with reference to the drawings.

Hereinafter, referring to FIGS. 1 to 7, a vehicle of the present embodiment will be described. FIG. 1 is a view showing the appearance of a vehicle 1 of the present embodiment and a power generator 3 and a parking assistance device 4 mounted on the vehicle 1. In the figure, the vehicle 1 of the present embodiment is provided with: a total of four wheels 2 disposed two at each of the front and the rear (although only two are seen in FIG. 1 where a side surface is seen, in actuality, there are two on the opposite side); the power generator 3 that generates power and is capable of transmitting the driving force to at least the two wheels 2 at the rear of the vehicle 1; and the parking assistance device 4 that controls the power generator 3 to assist parking of the vehicle 1.

Figure 2:
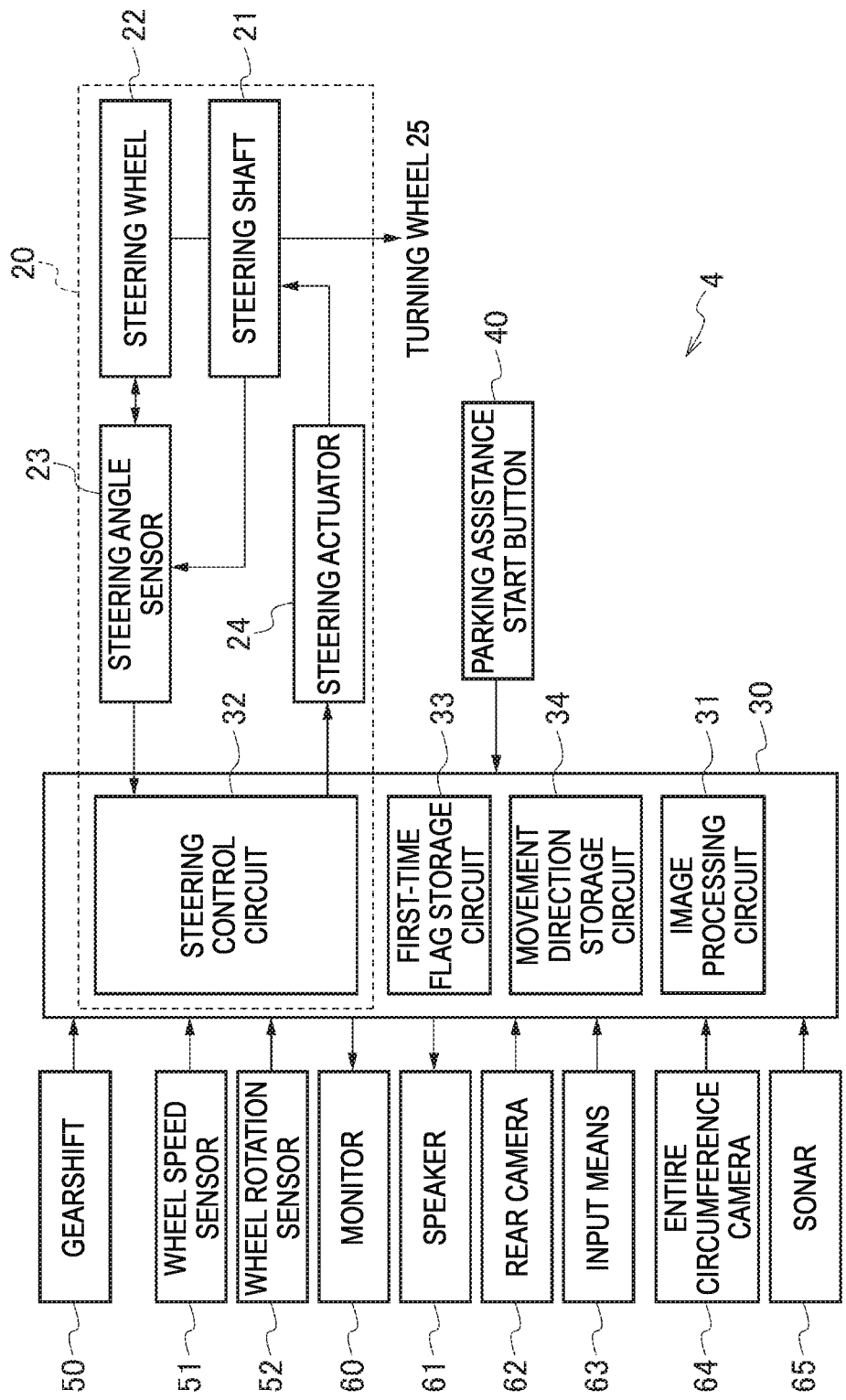
FIG. 2 is a block diagram showing a schematic structure of the parking assistance device mounted on the vehicle in the embodiment.

FIG. 2 is a block diagram showing a schematic structure of the parking assistance device 4 mounted on the vehicle 1 of the present embodiment. In FIG. 2, the parking assistance device 4 has: an automatic steering device 20; a parking assistance ECU (Electronic Control Unit, video image output device) 30; a parking assistance start button (second operation circuit) 40; a gearshift (operation circuit) 50; a wheel speed sensor 51; a wheel rotation sensor (detection circuit) 52; a monitor (display circuit) 60; a speaker 61; a rear camera 62; input means 63; an entire circumference camera 64; and a sonar 65. It is sufficient that either one of the entire circumference camera 64 or the sonar 65 is provided.

The automatic steering device 20 has a steering shaft 21, a steering wheel 22, a steering angle sensor 23 and a steering actuator 24, and is controlled by the parking assistance ECU 30 as a control device. The parking assistance ECU 30 is constituted by a CPU (Central Processing Unit), a ROM (Read Only Memory), a RAM (Random Access Memory), an input signal circuit, an output signal circuit, a power circuit and the like which are not shown. The parking assistance ECU 30 has: an image processing circuit 31 that processes an image obtained by the rear camera 62 and an image obtained by the entire circumference camera 64; a steering control circuit 32 that controls the automatic steering device 20; and a first-time flag storage circuit 33 and a movement direction storage circuit 34 used in the calculation of the position of the own vehicle. While the image processing circuit 31 and the steering control circuit 32 may be separated in hardware manner within the parking assistance ECU 30, they may be separated in software manner with the use of a common CPU, ROM, RAM and the like.

In the automatic steering device 20, the steering angle sensor 23 that detects the steering amount of the steering shaft 21 and the steering actuator 24 that provides a steering force are connected to the steering shaft 21 that transmits the movement of the steering wheel 22 to a turning wheel 25. The steering actuator 24 may serve also as a power steering device providing an assistance steering force at the time of steering by the driver as well as provides a steering force at the time of automatic steering.

In the parking assistance ECU 30, the steering control circuit 32 receives the output signal of the steering angle sensor 23 to control the driving of the steering actuator 24. Moreover, the steering control circuit 32 receives the output signal of the wheel speed sensor 51 disposed on each wheel to detect the speed of the wheel and the output signal of the wheel rotation sensor 52 that detects the rotation of at least one wheel in addition to the output signal of the steering angle sensor 23.

To the image processing circuit 31 of the parking assistance ECU 30, not only an image signal which is the output signal of the rear camera 62 disposed at the rear of the vehicle 1 and obtaining a rear image is inputted but also an image signal which is the output signal of the entire circumference camera 64 obtaining an image of the entire circumference is inputted. Since the rear camera 62 is separately provided, the entire circumference camera 64 obtains images of both sides of the vehicle 1 and a front image.

Moreover, to the image processing circuit 31, the following are connected: the input means 63 for accepting an operation input from a passenger (mainly, "driver") in parking assistance; the monitor 60 that displays information by means of an image to the passenger; the speaker 61 that presents information by means of a sound; the gearshift 50 that accepts a gearshift switching operation; and the sonar 65 for searching for an obstacle on the entire circumference of the vehicle 1 by a sound wave. The gearshift 50 accepts an operation of switching among, for example, drive (D), neutral (N), rear (R) and parking (P). Drive (D) corresponds to the first state, neutral (N) corresponds to the second state, and rear (R) corresponds the third state. The sonar 65 is disposed at each of both angular parts at the front and the rear of the vehicle 1.

When the parking assistance start button 40 is pressed, the parking assistance ECU 30 performs own vehicle position estimation and path calculation by use of the switching operation state of the gearshift 50, the output signal of the wheel speed sensor 51, the output signal of the wheel rotation sensor 52, the rear image by the rear camera 62, the entire circumference image (except the rear image) by the entire circumference camera 64 and the output signal of the sonar 65. During parking assistance, the parking assistance ECU 30 outputs a video image of the movement state of the vehicle 1 on the monitor 60 as the display circuit. For example, video images as shown below are outputted to the monitor 60. Although not shown, the parking assistance ECU 30 is provided with an output circuit for outputting a video image to the monitor 60.

(1) In a case where the gearshift 50 of the vehicle 1 is in drive (D) (in the case of the first state), a video image of a movement state of the vehicle 1 moving forward (moving in a direction) in response to the rotation of the wheels 2 detected by the wheel rotation sensor 52 is displayed on the monitor 60, and in a case where the gearshift is set in neutral (N) (set in the second state) thereafter, a video image of a movement state of the vehicle 1 moving forward (moving in the direction) in response to the rotation of the wheels 2 detected by the wheel rotation sensor 52 is outputted to the monitor 60.

(2) In a case where the gearshift 50 of the vehicle 1 is in rear (R) where the vehicle 1 moves in a second direction opposite to a first direction (the direction) (in the case of the third state), a video image of a movement state of the vehicle 1 moving in the second direction in response to the rotation of the wheels 2 detected by the wheel rotation sensor 52 is outputted to the monitor 60, and in a case where the gearshift 50 is set in neutral (N) (set in the second state) thereafter, a video image of a movement state of the vehicle 1 moving in the second direction in response to the rotation of the wheels 2 detected by the wheel rotation sensor 52 is outputted to the monitor 60.

(3) In a case where the parking assistance start button 40 is operated by a passenger and the gearshift 50 of the vehicle 1 is in neutral (N) (in the case of the second state), a video image of a state of the vehicle 1 not moving forward (not moving in the direction) in response to the rotation of the wheels 2 detected by the wheel rotation sensor 52 is outputted to the monitor 60. For example, since the previous state is not held immediately after a parking assistance start operation is performed, immediately after the key of the vehicle is turned to start the engine and immediately after a push button for starting the engine is pressed to set a driving possible state (this will be detailed later), the wheels 2 do not rotate and the vehicle 1 does not move.

In a case where the gearshift 50 of the vehicle 1 is set in drive (D) (set in the first state) thereafter, a video image of a movement state of the vehicle 1 moving forward (moving in the direction) in response to the rotation of the wheels 2 detected by the wheel rotation sensor 52 is outputted to the monitor 60, and in a case where the gearshift 50 of the vehicle 1 is set in neutral (N) (set in the second state) thereafter, a video image of a movement state of the vehicle 1 moving forward (moving in the direction) in response to the rotation of the wheels 2 detected by the wheel rotation sensor 52 is outputted to the monitor 60.

In a case where the gearshift 50 of the vehicle 1 is in drive (D) (in the case of the first state), a video image of a movement state of the vehicle 1 moving forward (moving in the direction) in response to the rotation of the wheels 2 detected by the wheel rotation sensor 52 is outputted to the monitor "60, in a case where the gearshift 50 of the vehicle 1 is set in neutral (N) (set in the second state) thereafter, a video image of a movement state of the vehicle 1 moving forward (moving in the direction) in response to the rotation of the wheels 2 detected by the wheel rotation sensor 52 is outputted to the monitor 60, and in a case where a time has elapsed with the vehicle 1 being in neutral (N) (a time has elapsed in the second state) thereafter, a video image of the state of the vehicle 1 not moving forward (not moving in the direction) in response to the rotation of the wheels 2 detected by the wheel rotation sensor 52 is outputted to the monitor 60. That is, in the second state, for example, in a case where a time (for example, one minute) has elapsed without the driver aboard the vehicle 1 performing any operation, there are cases where the parking assistance operation itself is stopped. In this case, naturally, the display of a movement state of the vehicle 1 moving in the direction in response to the rotation of the wheels 2 detected by the wheel rotation sensor 52 is not performed.

(5) In a case where the gearshift 50 of the vehicle 1 is in drive (D) (in the case of the first state), a video image of a movement state of the vehicle 1 moving forward (moving in the direction) in response to the rotation of the wheels 2 detected by the wheel rotation sensor 52 is outputted to the monitor 60, and in a case where the gearshift 50 of the vehicle 1 is set in neutral (N) (set in the second state) thereafter, a video image of a movement state of the vehicle 1 moving forward (moving in the direction) in response to the rotation of the wheels 2 detected by the wheel rotation sensor 52 is outputted to the monitor 60. In a case where a time has elapsed with the gearshift 50 of the vehicle 1 being set in neutral (N) (set in the second state) thereafter, a video image of a state of the vehicle 1 not moving forward (not moving in the direction) in response to the rotation of the wheels 2 detected by the wheel rotation sensor 52 is outputted to the monitor 60, and in a case where the gearshift 50 of the vehicle 1 is set in drive (D) (set in the first state) thereafter, a video image of a movement state of the vehicle 1 moving forward (moving in the direction) in response to the rotation of the wheels 2 detected by the wheel rotation sensor 52 is displayed on the monitor 60, and in a case where the gearshift 50 of the vehicle 1 is set in neutral (N) (set in the second state) thereafter, a video image of a movement state of the vehicle 1 moving forward (moving in the direction) in response to the rotation of the wheels 2 detected by the wheel rotation sensor 52 is outputted to the monitor 60.

While the main element performing the control is the parking assistance ECU 30 in the above (1) to (5), in a case where the main element performing the control is the vehicle 1, a description "a video image of a movement state of the vehicle 1 . . . is outputted to the monitor 60" is made a description "the movement state of the vehicle 1 . . . is displayed".

Drive (D) of the gearshift 50 is a shift lever signal at the time of forward movement, and the shift signal representative of the time of a forward movement can be S (Sports), B (Brake), 2 (Second), 3 (Third) or L (Low).

Next, the parking assistance processing by the parking assistance ECU 30 of the vehicle 1 of the present embodiment will be described. First, an own vehicle position estimation method will be described.

(Own Vehicle Position Estimation Method)

Figure 3B:
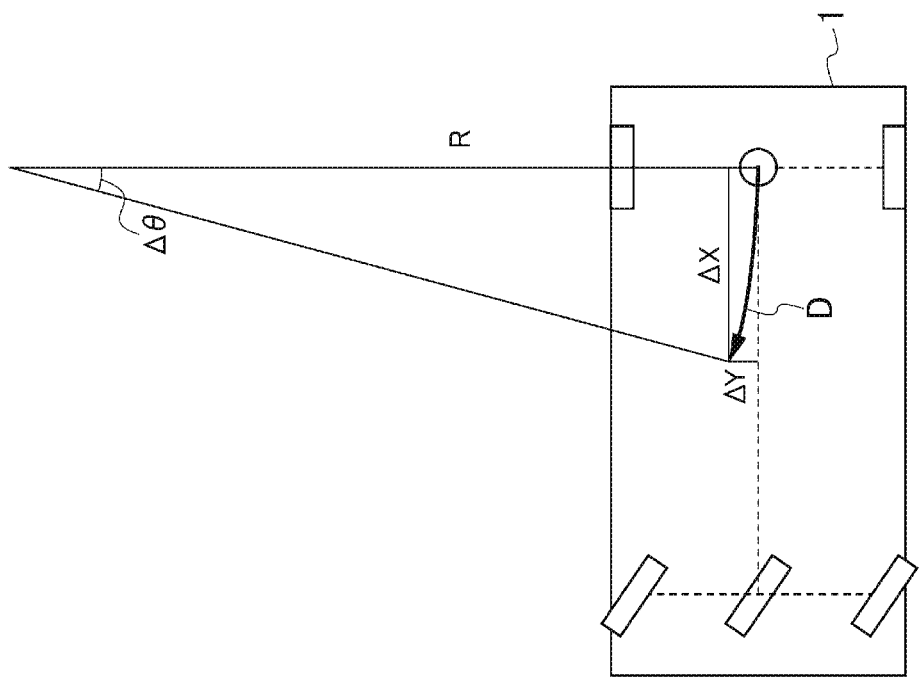
FIGS. 3A and 3B are views for explaining own vehicle position calculation processing in a parking assistance ECU of the vehicle in the embodiment.
Figure 3A:
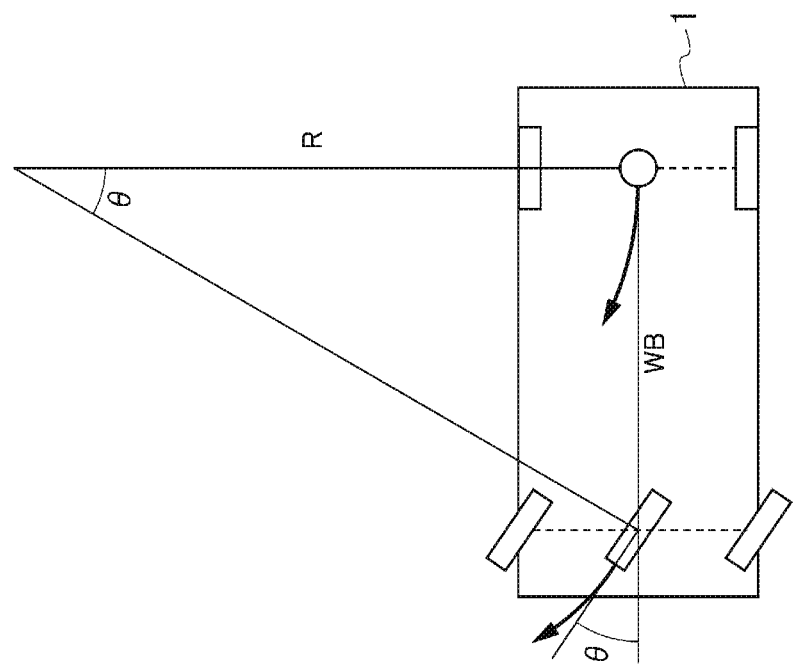

FIGS. 3A and 3B are views for explaining own vehicle position calculation processing in the parking assistance ECU 30. In FIG. 3A, the tire angle of the front wheels is represented as "θ", the wheel base of the vehicle 1 is represented as "WB", and the rotation radius of the vehicle 1 is represented as "R". Assuming that middle wheels are virtually present at the centers of the shafts of the front and rear wheels, the positions of the front and rear wheels of the vehicle 1 are positions of the middle wheels. The own vehicle position is the center of the rear wheel axle. The tire angle θ is calculated from the steering angle. The rotation radius R of the vehicle 1 is calculated as follows based on the tire angle θ and the wheel base WB:

$$R = WB/\tan\theta \qquad \text{expression (1)}$$

In FIG. 3B, the movement amount of the middle tire of the vehicle 1 is represented as "D", the change amount of the position of the vehicle 1 is represented as "ΔX, ΔY", and the change amount of the direction of the vehicle 1 is represented as "Δθ". One value on the x-axis is "X", and one value on the y-axis is "Y". The direction of the vehicle 1 is the direction in which the forefront of the vehicle 1 faces. The movement amount D of the middle tire is calculated from the wheel speed pulse or the speed.

D=the increment of the wheel speed pulse×the movement amount per pulse (=a fixed value measured in advance [for example, 2 cm]).

The course vector V of an arc V=(ΔX, ΔY, Δθ) is calculated by the following expression.

The change amount Δθ of the direction is calculated based on the rotation radius R and the movement amount D.

$$\Delta\theta = D/R \qquad \text{expression (2)}$$

The change amount ΔX, ΔY of the position is calculated based on the change amount Δθ of the direction of the vehicle 1 and the rotation radius R of the vehicle 1.

$$\Delta X = R \cdot \sin(\Delta\theta) \qquad \text{expression (3)}$$

$$\Delta Y = R \cdot (1 - \cos(\Delta\theta)) \qquad \text{expression (4)}$$

The calculated course vector (ΔX, ΔY, Δθ) is added to the current own vehicle position (X, Y, θ) to calculate an updated own vehicle position.

Figure 4:
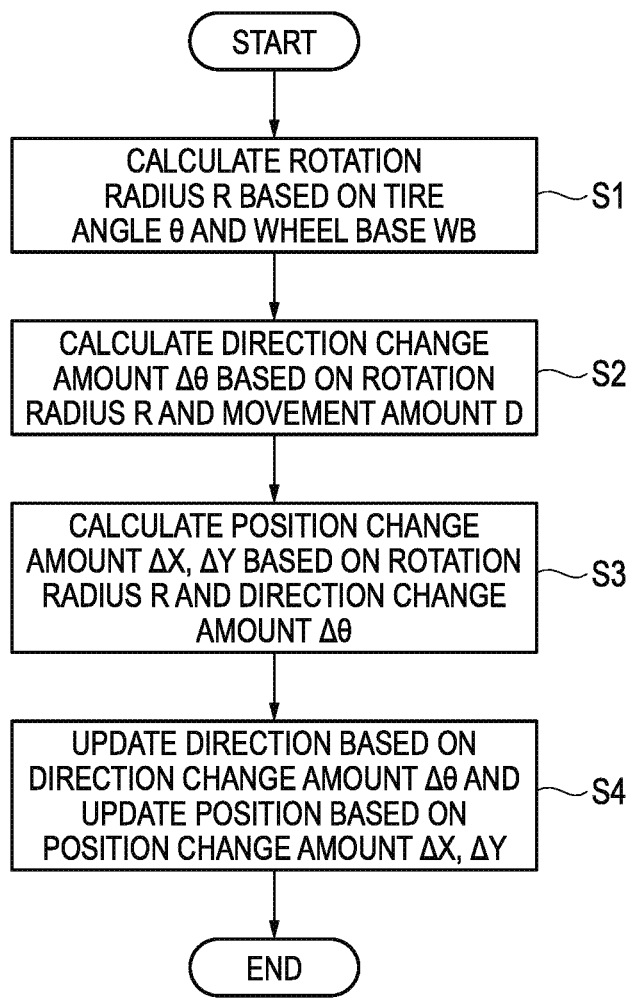
FIG. 4 is a flowchart for explaining the own vehicle position calculation processing in the parking assistance ECU of the vehicle in the embodiment.

FIG. 4 is a flowchart for explaining the own vehicle position calculation processing in the parking assistance ECU 30 of the vehicle 1 of the present embodiment. In the figure, the parking assistance ECU 30 first calculates the rotation radius R based on the tire angle θ and the wheel base WB (step S1). Then, the parking assistance ECU 30 calculates the direction change amount Δθ based on the rotation radius R and the movement amount D (step S2). Then, the parking assistance ECU 30 calculates the position change amount ΔX, ΔY based on the rotation radius R and the direction change amount Δθ (step S3). Then, the parking assistance ECU 30 updates the direction of the vehicle 1 based on the direction change amount Δθ, and updates the position of the vehicle 1 based on the position change amount ΔX, ΔY (step S4). While the present processing is ended after the position is updated, the present processing is repetitively executed until parking assistance is ended.

Next, the parking assistance processing in the parking assistance ECU 30 will be described.

Figure 5A:
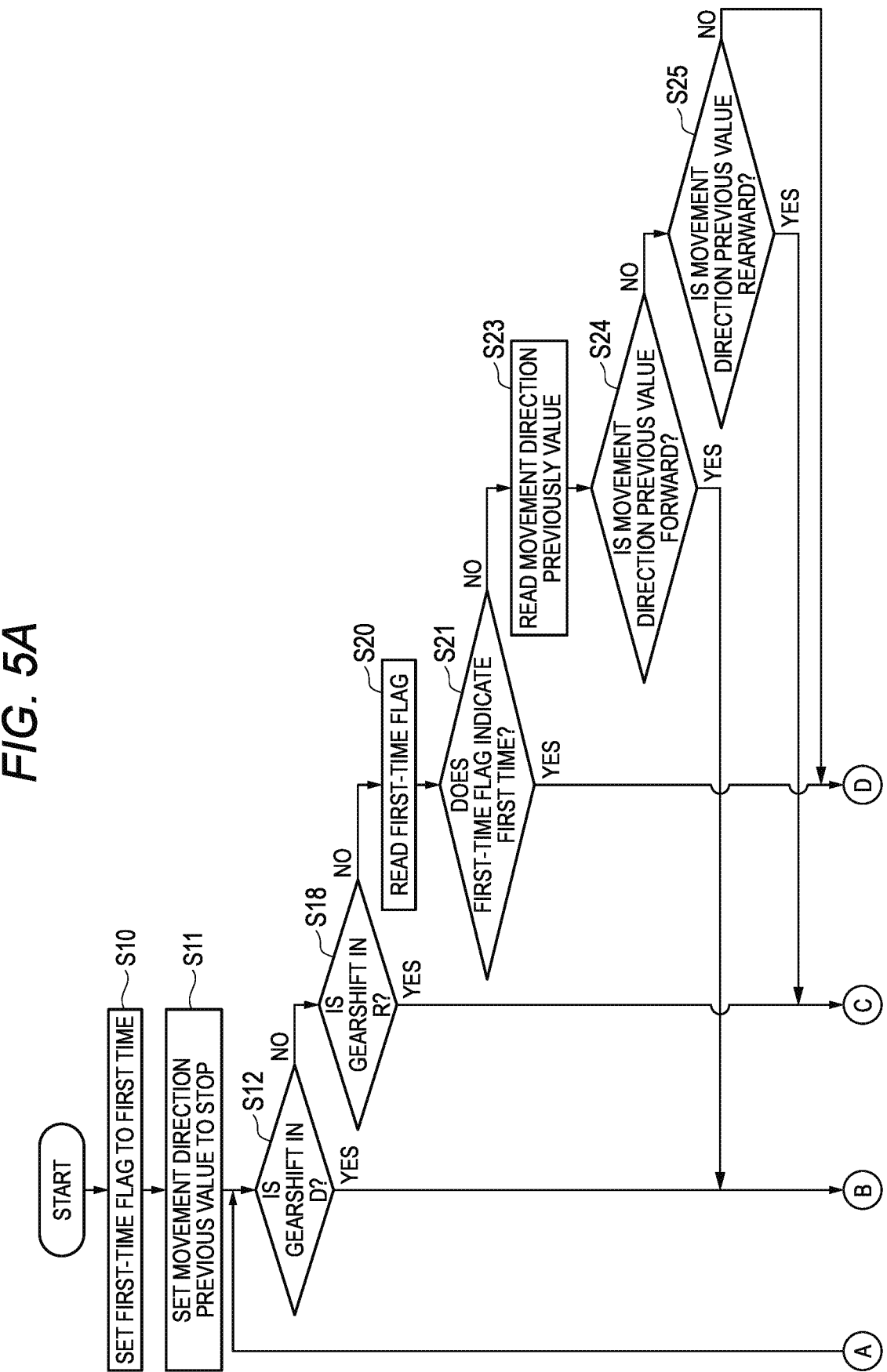
FIGS. 5A and 5B are flowcharts for explaining the parking assistance processing in the parking assistance ECU of the vehicle in the embodiment.
Figure 5B:
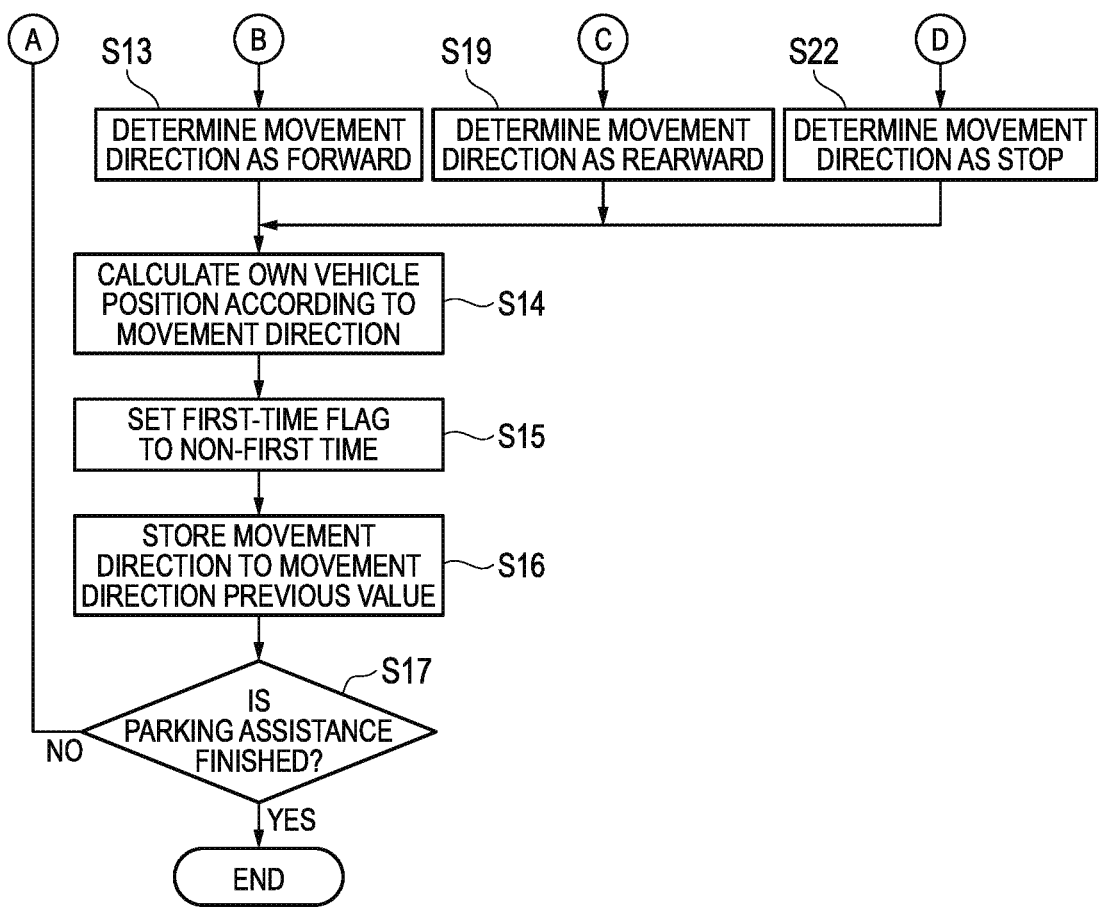

FIGS. 5A and 5B are flowcharts for explaining the parking assistance processing in the parking assistance ECU 30 of the vehicle 1 of the present embodiment. In the figure, the parking assistance ECU 30 first sets a flag for determining whether the present processing is the first-time processing or not (first-time flag) to "first time" (step S10). That is, the parking assistance ECU 30 stores "first time" in the first-time flag storage circuit 33. After setting the first-time flag to "first time", the parking assistance ECU 30 sets a movement direction previous value to "stop" (step S11). That is, the parking assistance ECU 30 stores "stop" in the movement direction storage circuit 34. Since the first state which is neither a forward movement nor a rearward movement is "stop", the movement direction previous value is "stop".

After setting the movement direction previous value to "stop", the parking assistance ECU 30 determines whether the gearshift 50 of the vehicle 1 is in drive (D) or not (step S12). When determining that the gearshift 50 is in driving (D) (when the determination result is "Yes" at step S12), the parking assistance ECU 30 determines that the movement direction is forward (step S13), and calculates the own vehicle position according to the movement direction (step S14). The calculation of the own vehicle position is continuously performed while the vehicle 1 is moving forward. After starting the own vehicle position calculation, the parking assistance ECU 30 sets the first-time flag to "non-first time" (step S15). That is, since step S12 is passed through once, the first-time flag indicates "non-first time". The parking assistance ECU 30 stores "non-first time" in the first-time flag storage circuit 33.

After setting the first-time flag to "non-first time", the parking assistance ECU 30 stores the movement direction to the movement direction previous value (step S16). When determining that the gearshift 50 is in drive (D) at the determination of step S12, since the movement direction is "forward", the parking assistance ECU 30 stores "forward" in the movement direction storage circuit 34. After storing the movement direction in the movement direction storage circuit 34, the parking assistance ECU 30 determines whether parking assistance is finished or not (step S17), and when determining that parking assistance is finished (when the determination result is "Yes" at step S17), the parking assistance ECU 30 ends the present processing. When determining that parking assistance is not finished (when the determination result is "No") at the determination of step S17, the parking assistance ECU 30 returns to step S12, and determines whether the gearshift 50 is in drive (D) or not. When the state of drive (D) continues, the processing of steps S13 to S17 is performed.

When determining that the gearshift 50 is not in drive (D) (when the determination result is "No") at the determination of step S12, the parking assistance ECU 30 determines whether the gearshift 50 is in rear (R) or not (step S18). When determining that the gearshift 50 is in rear (R) (when the determination result is "Yes" at step S18), the parking assistance ECU 30 determines that the movement direction is rearward (step S19), and calculates the own vehicle position according to the movement direction (step S14). In this case, the parking assistance ECU 30 calculates the own vehicle position according to the direction of the rearward movement.

After starting the calculation to calculate the own vehicle position according to the direction of the rearward movement, the parking assistance ECU 30 sets the first-time flag to "non-first time" (step S15). That is, the parking assistance ECU 30 stores "non-first time" in the first-time flag storage circuit 33. Then, the parking assistance ECU 30 stores the movement direction to the movement direction previous value (step S16). When determining that the gearshift 50 is in rear (R) at the determination of step S18, since the movement direction is "rearward", the parking assistance ECU 30 stores "rearward" in the movement direction storage circuit 34.

After storing the movement direction in the movement direction storage circuit 34, the parking assistance ECU 30 determines whether parking assistance is finished or not (step S17), and when determining that parking assistance is finished (when the determination result is "Yes" at step S17), the parking assistance ECU 30 ends the present processing. When determining that parking assistance is not finished (when the determination result is "No") at the determination of step S17, the parking assistance ECU 30 returns to step S12 and determines whether the gearshift 50 is in drive (D) or not. When determining that the gearshift 50 is in drive (D), the parking assistance ECU 30 performs the processing of steps S13 to S17, and when the state of rear (R) continues, the parking assistance ECU 30 performs the processing of step S19 and steps S14 to S17.

When determining that the gearshift 50 is not in rear (R) at step S18 (when the determination result is "No" at step S18), the parking assistance ECU 30 reads the first-time flag (step S20). In this case, if the determination result has never been "Yes" at the determination of step S12 or at the determination of step S18, the first-time flag indicates "first time", and if the determination result has been "Yes" at least once at the determination of step S12 or at the determination of step S18, the first-time flag indicates "non-first time".

After reading the first-time flag, the parking assistance ECU 30 determines whether the first-time flag being read indicates "first time" or not (step S21). When determining that the first-time flag indicates "first time" (when the determination result is "Yes" at step S21), the parking assistance ECU 30 determines that the movement direction is "stop" (step S22). When determining the movement direction as "stop", the parking assistance ECU 30 performs the above-described processing of steps S14 to S17. Here, since the vehicle 1 is stopped, the value does not change even though the processing of step S14, that is, the own vehicle position calculation is performed.

When determining that the first-time flag does not indicate "first time" (when the determination result is "No") at the determination of step S21, the parking assistance ECU 30 reads the movement direction previous value from the movement direction storage circuit 34 (step S23). After reading the movement direction previous value, the parking assistance ECU 30 determines whether the movement direction previous value is "forward" or not (step S24). When determining that the movement direction previous value is "forward" (when the determination result is "Yes" at step S24), the parking assistance ECU 30 proceeds to step S13, determines that the movement direction is "forward", and performs the above-described processing of steps S14 to S17.

When determining that the movement direction previous value is not "forward" (the determination result is "No") at the determination of S24, the parking assistance ECU 30 determines whether the movement direction previous value is "rearward" or not (step S25). When determining that the movement direction previous value is "rearward" (the determination result is "Yes" at step S25), the parking assistance ECU 30 proceeds to step S19, determines that the movement direction is "rearward", and performs the above-described processing of steps S14 to S17.

When determining that the movement direction previous value is not "rearward" (the determination result is "No" at step S25), the parking assistance ECU 30 proceeds to step S22, determines that the movement direction is "stop", and performs the above-described processing of steps S14 to S17.

Here, at the first time, in a case where it is assumed that the gearshift 50 is not in drive (D) or rear (R) and is in neutral (N) or parking (P), the parking assistance ECU 30 determines that the movement direction is "stop" at the first time. That is, at the first time, the processing is performed along the following route: "No" at step S12, "No" at step S18, step S20, "Yes" at step S21, step S22, and steps S14 to S17.

At the second and succeeding steps, the processing is performed along a route of "Yes" at step S12, step S13 and step S17 or a route of "No" at step S12, "Yes" at step S18, step S19 and steps S14 to S17.

Or the processing is performed along the following route: "No" at step S12, "No" at step S18, step S20, "No" at step S21, step S23, "Yes" at step S24 and steps S13 to S17.

Or the processing is performed along the following route: "No" at step S12, "No" at step S18, step S20, "No" at step S21, step S23, "No" at step S24, "Yes" at step S25, step S19 and steps S14 to S17.

Or the processing is performed along the following route: "No" at step S12, "No" at step S18, step S20, "No" at step S21, step S23, "No" at step S24, "No" at step S25, step S22 and steps S14 to S17.

Figure 6:
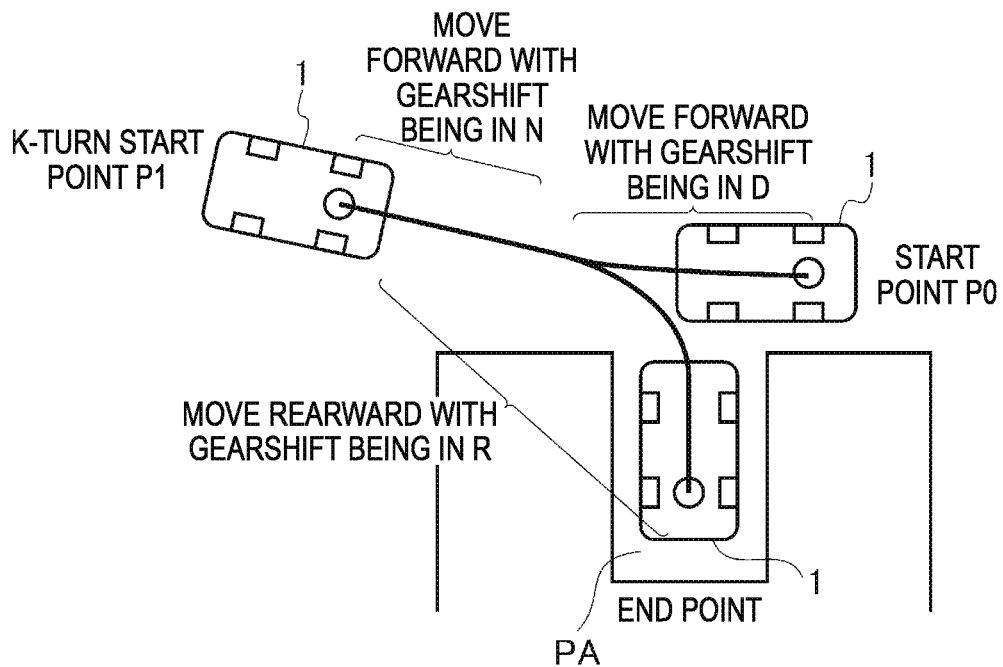
FIG. 6 is a view for explaining an example of parking assistance in the parking assistance ECU of the vehicle in the embodiment.

FIG. 6 is a view showing a movement state of the vehicle 1 in a case where after moving forward in drive (D), the vehicle 1 moves forward with the gearshift 50 being in neutral (N) in the vehicle 1 of the present embodiment. As shown in the figure, in a case where the gearshift 50 is switched into neutral (N) after the vehicle 1 moves forward with the gearshift 50 being set in drive (D) at the parking start point P0, since the parking assistance ECU 30 can accurately estimate the own vehicle position even if the vehicle 1 moves in neutral (N), the vehicle 1 can be parked in a correct position in the parking area PA by moving rearward from the K-turn start point P1 with the gearshift 50 being in rear (R).

Figure 7:
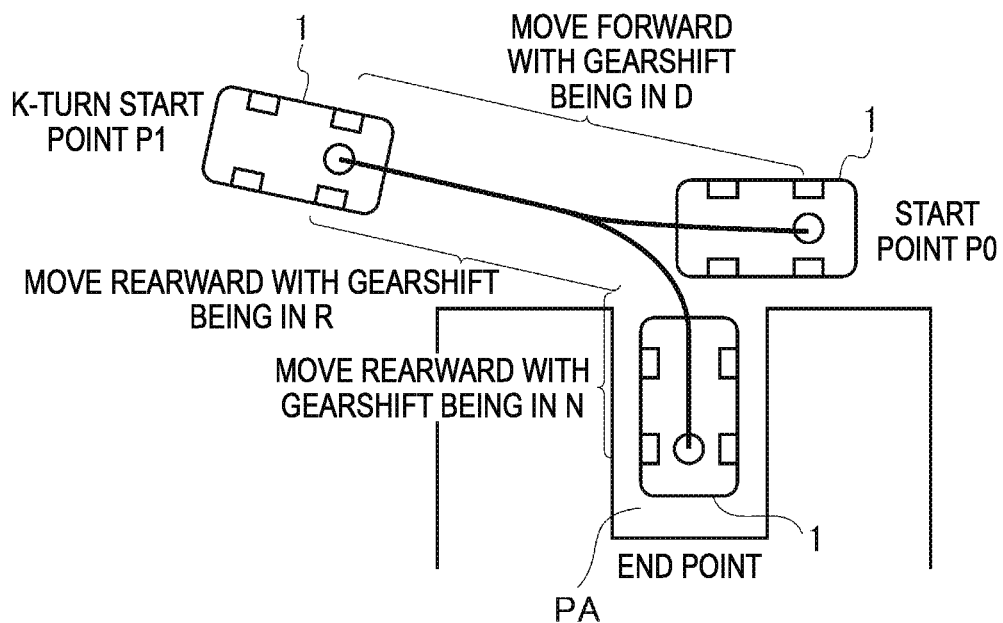
FIG. 7 is a view for explaining an example of parking assistance in the parking assistance ECU of the vehicle in the embodiment.
Figure 8:
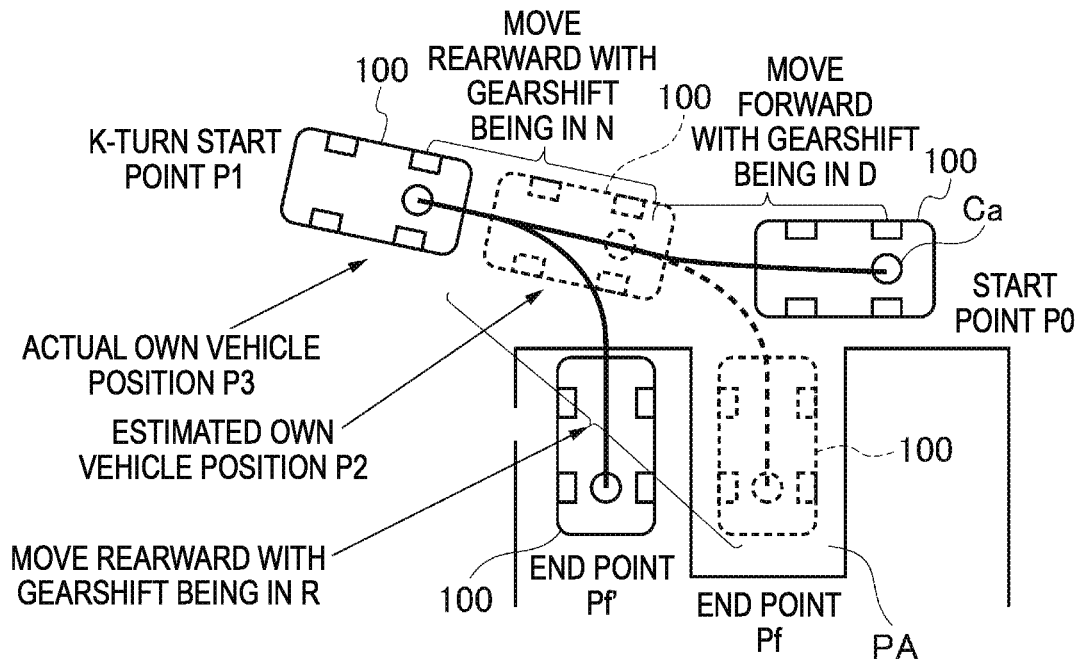
FIG. 8 is a view for explaining the problem in the conventional parking assistance device.
Figure 9:
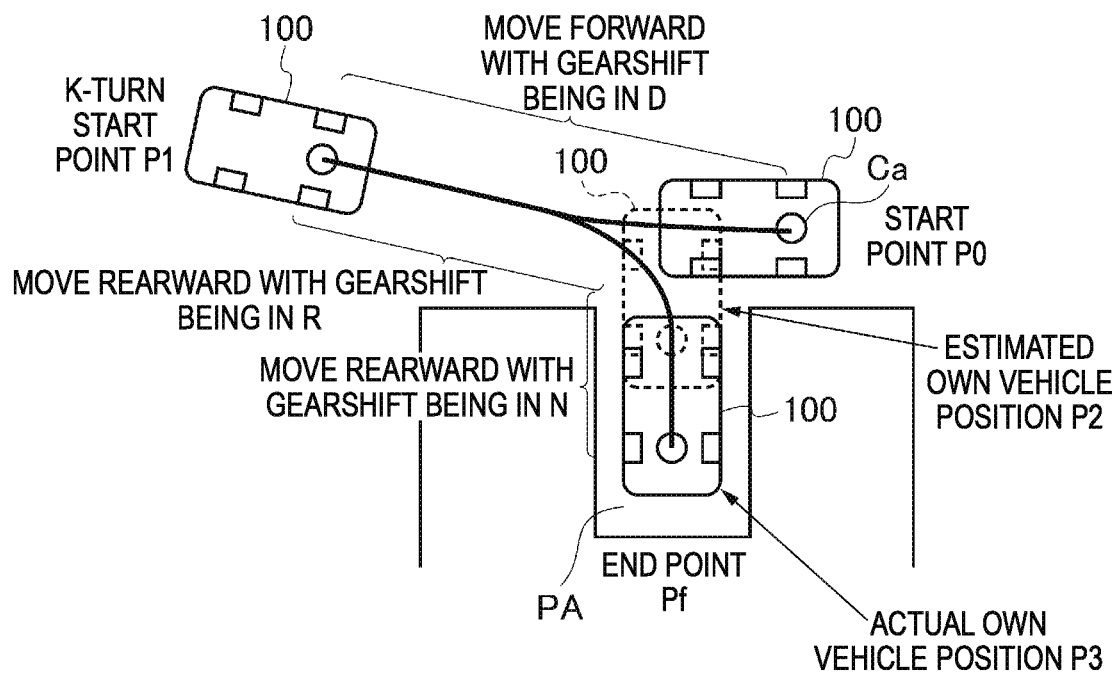
FIG. 9 is a view for explaining the problem in the conventional parking assistance device.

FIG. 7 is a view showing a movement state of the vehicle 1 in a case where the vehicle 1 moves rearward with the gearshift 50 being set in neutral (N) after moving rearward in rear (R) in the vehicle 1 of the present embodiment. As shown in the figure, in a case where after moving forward with the gearshift 50 being set in drive (D) at the parking start point P0, the vehicle 1 moves rearward with the gearshift 50 being set in rear (R) at the K-turn start point P1 and the gearshift 50 is switched into neutral (N) immediately before the vehicle 1 enters the parking area PA, since the parking assistance ECU 30 can accurately estimate the own vehicle position even if the vehicle 1 moves in neutral (N), the vehicle 1 can be parked in a correct position in the parking area PA.

As described above, in the vehicle 1 of the present embodiment, in a case where the gearshift 50 is in drive (D), in a case where a video image of a movement state of the vehicle 1 moving forward in response to the rotation of the wheels 2 detected by the wheel rotation sensor 52 is displayed on the monitor 60 and the gearshift 50 is set in neutral (N) thereafter, in a case where a video image of a movement state of the vehicle 1 moving forward in response to the rotation of the wheels 2 detected by the wheel rotation sensor 52 is displayed on the monitor 60 and the gearshift of the vehicle 1 is in rear (R) where the vehicle 1 moves in the second direction opposite to the first direction and in a case where a video image of a movement state of the vehicle 1 moving in the second direction in response to the rotation of the wheels 2 detected by the wheel rotation sensor 52 is displayed on the monitor 60 and the gearshift 50 is set in neutral (N) thereafter, since a video image of a movement state of the vehicle 1 moving in the second direction in response to the rotation of the wheels 2 detected by the wheel rotation sensor 52 is displayed on the monitor 60, even if the gearshift 50 is switched from drive (D) into neutral (N) or from rear (R) into neutral (N), the passenger of the vehicle 1 can accurately grasp the own vehicle position, so that the vehicle 1 can be parked in a correct position in the parking area.

Moreover, in the parking assistance ECU 30, in a case where the gearshift 50 is in neutral (N) or parking (P), the previous state of the gearshift 50 is succeeded and the own vehicle position is updated determining that the movement direction is "forward" when the movement direction previous value is forward and determining that the movement direction is "rearward" when the movement direction previous value is rearward, so that accurate position estimation can be performed and this enables the vehicle 1 to be guided to a correct position in the parking area.

While the own vehicle position estimation of the vehicle 1 of the present embodiment is effective in a case where the gearshift 50 is in neutral (N), in a case where the gearshift is in parking (P), the vehicle 1 may be always regarded as being stopped. This is because it is approximately several centimeters that the vehicle 1 moves with the gearshift 50 being in parking (P).

Moreover, the vehicle 1 of the present embodiment is also applicable to a back camera system in making the back camera (the rear camera 62) effective even when the gearshift 50 is switched into neutral (N) after the vehicle 1 moves rearward with the gearshift 50 being in rear (R).

Moreover, the own vehicle position estimation of the vehicle 1 of the present embodiment is also applicable to the own vehicle position estimation of navigation while the vehicle 1 is moving (moving forward, moving rearward) with the gearshift 50 being in neutral (N).

Moreover, while the vehicle 1 of the present embodiment is a four-wheel vehicle having a total of four wheels disposed two at each of the front and the rear, it may be a vehicle having one or more wheels and the number of wheels is not limited.

The vehicle and the video image output device of the present disclosure are useful for vehicles such as cars.

Here, the above embodiments are summarizes as follows.

A vehicle of the present disclosure is a vehicle provided with: at least one wheel; a power generator that generates power and is configured to transmit a driving force to the at least one wheel; a detection circuit configured to detect a rotation of the at least one wheel; and a display circuit, the display circuit is configured to display a movement state of the vehicle in response to the rotation of the at least one wheel detected by the detection circuit. The vehicle includes: a first state where the power generator transmits the driving force to the at least one wheel and the vehicle moves in a direction; and a second state where the power generator does not transmit the driving force to the at least one wheel. In a case of the first state, the display circuit displays a movement state of the vehicle moving in the direction in response to the rotation of the at least one wheel detected by the detection circuit. In a case where the vehicle becomes the second state after the first state, the display circuit displays a movement state of the vehicle moving in the direction in response to the rotation of the at least one wheel detected by the detection circuit.

According to the present disclosure, in a case of the first state where the vehicle moves in the direction, the display circuit can display a movement state of the vehicle moving in the direction, and in a case where the second state where no driving force is transmitted to the wheel is brought about from the first state, the display circuit can display a movement state of the vehicle moving in the direction. Consequently, the passenger can accurately grasp the own vehicle position, so that the vehicle can be parked in a correct position in the driving area.

In the vehicle of the present disclosure, in the above-described structure, the detection circuit detects only the rotation of the at least one wheel.

According to the present disclosure, the rotation of the wheel can be surely detected.

In the vehicle of the present disclosure, in the above-described structure, an operation circuit operable by a passenger is further provided, and the operation circuit is configured to accept at least an operation to switch between the first state and the second state.

According to the present disclosure, the passenger can freely switch from the first state to the second state or from the second state to the first state.

In the vehicle of the present disclosure, in the above-described structure, a gearshift is in neutral in the second state.

According to the present disclosure, in a case where the gearshift is set in neutral after the first state, the display circuit can display a movement state of the vehicle moving in the direction.

In the vehicle of the present disclosure, in the above-described structure, a gearshift is in parking in the second state.

Here, in the vehicle of the present disclosure, in a case where the gearshift is set in parking after the first state, although the driving wheels are locked, there are cases where the vehicle stops after moving slightly (for example, several centimeters). According to the vehicle of the present disclosure, even in this case, the display circuit can display a movement state of the vehicle slightly moving in the direction and a stop state of the vehicle that stops after moving slightly.

In the vehicle of the present disclosure, in the above-described structure, with the direction as a first direction, the vehicle further includes a third state where the power generator transmits the driving force to the at least one wheel and the vehicle moves in a second direction opposite to the first direction, in a case of the third state, the display circuit displays a movement state of the vehicle moving in the second direction in response to the rotation of the at least one wheel detected by the detection circuit, and in a case where the vehicle becomes the second state after the third state, the display circuit displays a movement state of the vehicle moving in the second direction in response to the rotation of the at least one wheel detected by the detection circuit.

According to the present disclosure, in a case of the third state where the vehicle moves in the second direction opposite to the first direction, the display circuit can display a movement state of the vehicle moving in the second direction, and in a case where the second state is brought about after the third state, the display circuit can display a movement state of the vehicle moving in the second direction.

In the vehicle of the present disclosure, in the above-described structure, the first direction is forward, and the second direction is rearward. The present disclosure is not limited thereto; the first direction may be rearward and the second direction may be forward.

According to the present disclosure, the display circuit can display a movement state of the vehicle moving forward and a movement state of the vehicle moving rearward.

In the vehicle of the present disclosure, in the above-described structure, with the operation circuit as a first operation circuit, a second operation circuit operable by a passenger is further provided, in a case where a operation is performed on the second operation circuit in a case of the second state, the display circuit displays a state of the vehicle not moving in the direction in response to the rotation of the at least one wheel detected by the detection circuit, then, in a case where the vehicle becomes the first state, the display circuit displays a movement state of the vehicle moving in the direction in response to the rotation of the at least one wheel detected by the detection circuit, and then, in a case where the vehicle becomes the second state, the display circuit displays a movement state of the vehicle moving in the direction in response to the rotation of the at least one wheel detected by the detection circuit.

According to the present disclosure, in a case where the passenger performs a operation on the second operation circuit, if the vehicle is in the second state, the display circuit can display a state of the vehicle not moving in the direction. The operation includes, for example, an operation to start parking assistance, an operation to turn the key of the vehicle to start the engine and an operation to press a push button to set a driving possible state.

In the vehicle of the present disclosure, in the above-described structure, in the case of the first state, the display circuit displays a movement state of the vehicle moving in the direction in response to the rotation of the at least one wheel detected by the detection circuit, in a case where the vehicle becomes the second state thereafter, the display circuit displays a movement state of the vehicle moving in the direction in response to the rotation of the at least one wheel detected by the detection circuit, and in a case where a time has elapsed in the second state thereafter, the display circuit displays a state of the vehicle not moving in the direction in response to the rotation of the at least one wheel detected by the detection circuit. That is, in the second state, for example, in a case where a time (for example, one minute) has elapsed without the driver aboard the vehicle performing any operation, there are cases where the parking assistance operation itself is stopped. In this case, naturally, the display of a movement state of the vehicle moving in the direction in response to the rotation of the wheel detected by the detection circuit is not performed.

According to the present disclosure, in a case where the vehicle is in the first state, the display circuit can display a movement state of the vehicle moving in the direction, in a case where the vehicle is brought into the second state thereafter, the display circuit can display a movement state of the vehicle moving in the direction, and in a case where the time has elapsed in the second state thereafter, the display circuit can display a video image of a state of the vehicle not moving in the direction.

In the vehicle of the present disclosure, in the above-described structure, in the case of the first state, the display circuit displays a movement state of the vehicle moving in the direction in response to the rotation of the at least one wheel detected by the detection circuit, in a case where the vehicle becomes the second state thereafter, the display circuit displays a movement state of the vehicle moving in the direction in response to the rotation of the at least one wheel detected by the detection circuit, in a case where a time has elapsed in the second state thereafter, the display circuit displays a state of the vehicle not moving in the direction in response to the rotation of the at least one wheel detected by the detection circuit, in a case where the first state is brought about thereafter, the display circuit displays a movement state of the vehicle moving in the direction in response to the rotation of the at least one wheel detected by the detection circuit, and in a case where the vehicle becomes the second state thereafter, the display circuit displays a movement state of the vehicle moving in the direction in response to the rotation of the at least one wheel detected by the detection circuit.

According to the present disclosure, in a case where the vehicle is in the first state, the display circuit can display a movement state of the vehicle moving in the direction, in a case where the vehicle is brought into the second state thereafter, the display circuit can display a movement state of the vehicle moving in the direction, in a case where the time has elapsed with the vehicle being in the second state thereafter, the display circuit can display a video image of a state of the vehicle not moving in the direction, in a case where the vehicle is brought into the first state thereafter, the display circuit can display a movement state of the vehicle moving in the direction, and in a case where the vehicle is brought into the second state thereafter, the display circuit can display a movement state of the vehicle moving in the direction.

A video image output device of the present disclosure is a video image output device mountable on a vehicle provided with: at least one wheel; a power generator that generates power and is configured to transmit a driving force to the at least one wheel; a detection circuit configured to detect a rotation of the at least one wheel; and a display circuit, an output circuit is provided that outputs a video image to the display circuit, the output circuit is configured to output to the display circuit a video image of a movement state of the vehicle in response to the rotation of the at least one wheel detected by the detection circuit, the following states are provided: a first state where the power generator transmits the driving force to the at least one wheel and the vehicle moves in a direction; and a second state where the power generator does not transmit the driving force to the at least one wheel, in the case of the first state, the output circuit outputs a video image of a movement state of the vehicle moving in the direction in response to the rotation of the at least one wheel detected by the detection circuit, and in a case where the vehicle becomes the second state after the first state, the output circuit outputs a video image of a movement state of the vehicle moving in the direction in response to the rotation of the at least one wheel detected by the detection circuit.

According to the present disclosure, in the case of the first state where the vehicle moves in the direction, the output circuit can output to the display circuit a video image of a movement state of the vehicle moving in the direction, and in a case where the second state where no driving force is transmitted to the wheel is brought about from the first state, the output circuit can output to the display circuit a video image of a movement state of the vehicle moving in the direction. Consequently, the passenger can accurately grasp the own vehicle position, so that the vehicle can be parked in a correct position in the driving area.

In the video image output device of the present disclosure, in the above-described structure, the detection circuit detects only the rotation of the at least one wheel.

According to the present disclosure, the rotation of the wheel can be surely detected.

In the video image output device of the present disclosure, in the above-described structure, the vehicle is further provided with an operation circuit operable by a passenger, and the operation circuit is configured to accept at least an operation to switch between the first state and the second state.

According to the present disclosure, the passenger can freely switch from the first state to the second state or from the second state to the first state.

In the video image output device of the present disclosure, in the above-described structure, in the second state of the vehicle, a gearshift is in neutral.

According to the present disclosure, in a case where the gearshift is set in neutral after the first state, the output circuit can output to the display circuit a video image of a movement state of the vehicle moving in the direction.

In the video image output device of the present disclosure, in the above-described structure, in the second state of the vehicle, a gearshift is in parking.

Here, in the vehicle of the present disclosure, in a case where the gearshift is set in parking after the first state, although the driving wheels are locked, there are cases where the vehicle stops after moving slightly (for example, several centimeters). According to the video image output device of the present disclosure, even in this case, the output circuit can output to the display circuit a video image of a movement state of the vehicle slightly moving in the direction and a stop state of the vehicle that stops after moving slightly.

In the video image output device of the present disclosure, in the above-described structure, with the direction as a first direction, a third state is further provided where the power generator transmits the driving force to the at least one wheel and the vehicle moves in a second direction opposite to the first direction, in a case of the third state, the output circuit outputs a video image of a movement state of the vehicle moving in the second direction in response to the rotation of the at least one wheel detected by the detection circuit, and in a case where the vehicle becomes the second state after the third state, the output circuit outputs a video image of a movement state of the vehicle moving in the second direction in response to the rotation of the at least one wheel detected by the detection circuit.

According to the present disclosure, in the case of the third state where the vehicle moves in the second direction opposite to the first direction, the output circuit can output to the display circuit a video image of a movement state of the vehicle moving in the second direction, and in a case where the second state is brought about after the third state, the output circuit can output to the display circuit a video image of a movement state of the vehicle moving in the second direction.

In the video image output device of the present disclosure, in the above-described structure, the first direction is forward, and the second direction is rearward. The present disclosure is not limited thereto; the first direction may be rearward and the second direction may be forward.

According to the present disclosure, the output circuit can output to the display circuit a video image of a movement state of the vehicle moving forward and a video image of a movement state of the vehicle moving rearward.

In the video image output device of the present disclosure, in the above-described structure, with the above-described operation circuit as a first operation circuit, the vehicle is further provided with a second operation circuit operable by a passenger, in a case where a operation is performed on the second operation circuit in a case of the second state, the output circuit outputs a video image of a state of the vehicle not moving in the direction in response to the rotation of the at least one wheel detected by the detection circuit, then, in a case where the vehicle becomes the first state, the output circuit outputs a video image of a movement state of the vehicle moving in the direction in response to the rotation of the at least one wheel detected by the detection circuit, and then, in a case where the vehicle becomes the second state, the output circuit outputs a video image of a movement state of the vehicle moving in the direction in response to the rotation of the at least one wheel detected by the detection circuit.

According to the present disclosure, in a case where the passenger performs a operation on the second operation circuit, if the vehicle is in the second state, the output circuit can output to the display circuit a video image of a state of the vehicle not moving in the direction, then, in a case where the vehicle is brought into the first state, the output circuit can output to the display circuit a video image of a movement state of the vehicle moving in the direction, and then, in a case where the vehicle is brought into the second state, the output circuit can output to the display circuit a video image of a movement state of the vehicle moving in the direction.

In the video image output device of the present disclosure, in the above-described structure, in the case of the first state, the output circuit outputs a video image of a movement state of the vehicle moving in the direction in response to the rotation of the at least one wheel detected by the detection circuit, in a case where the vehicle becomes the second state thereafter, the output circuit outputs a video image of a movement state of the vehicle moving in the direction in response to the rotation of the at least one wheel detected by the detection circuit, and in a case where a time has elapsed in the second state thereafter, the output circuit outputs a video image of a state of the vehicle not moving in the direction in response to the rotation of the at least one wheel detected by the detection circuit. That is, in the second state, for example, in a case where a time (for example, one minute) has elapsed without the driver aboard the vehicle performing any operation, there are cases where the parking assistance operation itself is stopped. In this case, naturally, the output of a video image of a movement state of the vehicle moving in the direction in response to the rotation of the wheel detected by the detection circuit is not performed.

According to the present disclosure, in a case where the vehicle is in the first state, the output circuit can output to the display circuit a video image of a movement state of the vehicle moving in the direction, in a case where the vehicle is brought into the second state thereafter, the output circuit can output to the display circuit a video image of a movement state of the vehicle moving in the direction, and in a case where the time has elapsed in the second state thereafter, the output circuit can output to the display circuit a video image of a state not moving in the direction.

In the video image output device of the present disclosure, in the above-described structure, in the case of the first state, the output circuit outputs a video image of a movement state of the vehicle moving in the direction in response to the rotation of the at least one wheel detected by the detection circuit, in a case where the second state is brought about thereafter, the output circuit outputs a video image of a movement state of the vehicle moving in the direction in response to the rotation of the at least one wheel detected by the detection circuit, in a case where a time has elapsed in the second state thereafter, the output circuit outputs a video image of a state of the vehicle not moving in the direction in response to the rotation of the at least one wheel detected by the detection circuit, in a case where the vehicle becomes the first state thereafter, the output circuit outputs a video image of a movement state of the vehicle moving in the direction in response to the rotation of the at least one wheel detected by the detection circuit, and in a case where the vehicle becomes the second state thereafter, the output circuit outputs a video image of a movement state of the vehicle moving in the direction in response to the rotation of the at least one wheel detected by the detection circuit.

According to the present disclosure, in a case where the vehicle is in the first state, the output circuit can output to the display circuit a video image of a movement state of the vehicle moving in the direction, in a case where the vehicle is brought into the second state thereafter, the output circuit can display on the display circuit a video image of a movement state of the vehicle moving in the direction, in a case where the time has elapsed with the vehicle being in the second state thereafter, the output circuit can output to the display circuit a video image of a state of the vehicle not moving in the direction, in a case where the vehicle is brought into the first state thereafter, the output circuit can output to the display circuit a video image of a movement state of the vehicle moving in the direction, and in a case where the vehicle is brought into the second state thereafter, the output circuit can output to the display circuit a video image of a movement state of the vehicle moving in the direction.

According to the present disclosure, even in a case where the vehicle moves with the gearshift being in neutral (N), the own vehicle position can be accurately estimated, so that the vehicle can be parked in a correct position.

While various embodiments have been described herein above, it is to be appreciated that various changes in form and detail may be made without departing from the spirit and scope of the invention(s) presently or hereafter claimed.

This application is based on and claims priority under 35 USC 119 from Japanese Patent Application No. 2019-057342 filed on Mar. 25, 2019, the contents of which are incorporated herein by reference.

What is claimed is:

1. A vehicle comprising:
at least one wheel;
a power generator that generates power and is configured to transmit a driving force to the at least one wheel;
a detection circuit that is configured to detect a rotation of the at least one wheel; and
a display circuit,
wherein the display circuit is configured to display a movement state of the vehicle in response to the rotation of the at least one wheel detected by the detection circuit,
the vehicle includes
a first state where the power generator transmits the driving force to the at least one wheel and the vehicle moves in a direction; and
a second state where the power generator does not transmit the driving force to the at least one wheel,
in a case where the vehicle becomes the first state, the display circuit displays a movement state of the vehicle that moves in the direction in response to the rotation of the at least one wheel detected by the detection circuit, and
in a case where the vehicle becomes the second state after the first state, the display circuit displays a movement state of the vehicle that moves in the direction in response to the rotation of the at least one wheel detected by the detection circuit.

2. The vehicle according to claim 1,
wherein the detection circuit detects only the rotation of the at least one wheel.

3. The vehicle according to claim 1 further comprising an operation circuit operable by a passenger,
wherein the operation circuit is configured to accept an operation to switch between the first state and the second state.

4. The vehicle according to claim 1,
wherein in the second state, a gearshift is in neutral.

5. The vehicle according to claim 1,
wherein in the second state, a gearshift is in parking.

6. The vehicle according to claim 1,
wherein the direction is a first direction,
the vehicle further includes a third state where the power generator transmits the driving force to the at least one wheel and the vehicle moves in a second direction opposite to the first direction,
in a case where the vehicle becomes the third state, the display circuit displays a movement state of the vehicle that moves in the second direction in response to the rotation of the at least one wheel detected by the detection circuit, and
in a case where the vehicle becomes the second state after the third state, the display circuit displays a movement state of the vehicle that moves in the second direction in response to the rotation of the at least one wheel detected by the detection circuit.

7. The vehicle according to claim 6,
wherein the first direction is forward, and
the second direction is rearward.

8. The vehicle according to claim 3,
wherein the operation circuit is a first operation circuit,
the vehicle further has a second operation circuit operable by a passenger,
in a case where a operation is performed on the second operation circuit in a case of the second state, the display circuit displays a state of the vehicle not moving in the direction in response to the rotation of the at least one wheel detected by the detection circuit,
then, in a case where the vehicle becomes the first state, the display circuit displays a movement state of the vehicle moving in the direction in response to the rotation of the at least one wheel detected by the detection circuit, and
then, in a case where the vehicle become the second state, the display circuit displays a movement state of the vehicle that moves in the direction in response to the rotation of the at least one wheel detected by the detection circuit.

9. The vehicle according to claim 1,
wherein in the case of the first state, the display circuit displays a movement state of the vehicle moving in the direction in response to the rotation of the at least one wheel detected by the detection circuit,
in a case where the vehicle becomes the second state thereafter, the display circuit displays a movement state of the vehicle that moves in the direction in response to the rotation of the at least one wheel detected by the detection circuit, and
in a case where a time has elapsed in the second state thereafter, the display circuit displays a state of the vehicle that does not move in the direction in response to the rotation of the at least one wheel detected by the detection circuit.

10. The vehicle according to claim 9
wherein in the case of the first state, the display circuit displays a movement state of the vehicle that moves in the direction in response to the rotation of the at least one wheel detected by the detection circuit,
in a case where the vehicle becomes the second state thereafter, the display circuit displays a movement state of the vehicle that moves in the direction in response to the rotation of the at least one wheel detected by the detection circuit,
in a case where a time has elapsed in the second state thereafter, the display circuit displays a state of the vehicle that does not move in the direction in response to the rotation of the at least one wheel detected by the detection circuit, in a case where the vehicle becomes the first state thereafter, the display circuit displays a movement state of the vehicle that moves in the direction in response to the rotation of the at least one wheel detected by the detection circuit, and in a case where the vehicle becomes the second state thereafter, the display circuit displays a movement state of the vehicle that moves in the direction in response to the rotation of the at least one wheel detected by the detection circuit.

11. A video image output device mountable on a vehicle having at least one wheel; a power generator that generates power and is configured to transmit a driving force to the at least one wheel; a detection circuit configured to detect a rotation of the at least one wheel; and a display circuit, the video image output device comprising:

an output circuit that outputs a video image to the display circuit, wherein the output circuit is configured to output to the display circuit a video image of a movement state of the vehicle in response to the rotation of the at least one wheel detected by the detection circuit, the vehicle includes
 a first state where the power generator transmits the driving force to the at least one wheel and the vehicle moves in a direction; and
 a second state where the power generator does not transmit the driving force to the at least one wheel, in the case of the vehicle becomes the first state, the output circuit outputs a video image of a movement state of the vehicle moving in the direction in response to the rotation of the at least one wheel detected by the detection circuit, and in a case where the vehicle becomes the second state after the first state, the output circuit outputs a video image of a movement state of the vehicle moving in the direction in response to the rotation of the at least one wheel detected by the detection circuit.

12. The video image output device according to claim 11, wherein the detection circuit detects only the rotation of the at least one wheel.

13. The video image output device according to claim 11, wherein the vehicle further has an operation circuit operable by a passenger, and the operation circuit is configured to accept an operation to switch between the first state and the second state.

14. The video image output device according to claim 11, wherein in the second state of the vehicle, a gearshift is in neutral.

15. The video image output device according to claim 11, wherein in the second state of the vehicle, a gearshift is in parking.

16. The video image output device according to claim 11, wherein the direction is a first direction, the vehicle further includes a third state where the power generator transmits the driving force to the at least one wheel and the vehicle moves in a second direction opposite to the first direction, in a case of the third state, the output circuit outputs a video image of a movement state of the vehicle moving in the second direction in response to the rotation of the at least one wheel detected by the detection circuit, and in a case where the vehicle becomes the second state after the third state, the output circuit outputs a video image of a movement state of the vehicle moving in the second direction in response to the rotation of the at least one wheel detected by the detection circuit.

17. The video image output device according to claim 16, wherein the first direction is forward, and
the second direction is rearward.

18. The video image output device according to claim 13, wherein the operation circuit is a first operation circuit, the vehicle further has a second operation circuit operable by a passenger, in a case where a operation is performed on the second operation circuit in a case of the second state, the output circuit outputs a video image of a state of the vehicle not moving in the direction in response to the rotation of the at least one wheel detected by the detection circuit, then, in a case where the vehicle becomes the first state, the output circuit outputs a video image of a movement state of the vehicle moving in the direction in response to the rotation of the at least one wheel detected by the detection circuit, and then, in a case where the vehicle becomes the second state, the output circuit outputs a video image of a movement state of the vehicle moving in the direction in response to the rotation of the at least one wheel detected by the detection circuit.

19. The video image output device according to claim 11, wherein in the case of the first state, the output circuit outputs a video image of a movement state of the vehicle moving in the direction in response to the rotation of the at least one wheel detected by the detection circuit, in a case where the vehicle becomes the second state thereafter, the output circuit outputs a video image of a movement state of the vehicle moving in the direction in response to the rotation of the at least one wheel detected by the detection circuit, and in a case where a time has elapsed in the second state thereafter, the output circuit outputs a video image of a state of the vehicle not moving in the direction in response to the rotation of the at least one wheel detected by the detection circuit.

20. The video image output device according to claim 19, wherein in the case of the first state, the output circuit outputs a video image of a movement state of the vehicle moving in the direction in response to the rotation of the at least one wheel detected by the detection circuit, in a case where the vehicle becomes the second state thereafter, the output circuit outputs a video image of a movement state of the vehicle moving in the direction in response to the rotation of the at least one wheel detected by the detection circuit, in a case where a time has elapsed in the second state thereafter, the output circuit outputs a video image of a state of the vehicle not moving in the direction in response to the rotation of the at least one wheel detected by the detection circuit, in a case where the vehicle becomes the first state thereafter, the output circuit outputs a video image of a movement state of the vehicle moving in the direction in response to the rotation of the at least one wheel detected by the detection circuit, and in a case where the vehicle becomes the second state thereafter, the output circuit outputs a video image of a movement state of the vehicle moving in the direction in response to the rotation of the at least one wheel detected by the detection circuit.

* * * * *